United States Patent [19]
Groiss

[11] Patent Number: 5,735,693
[45] Date of Patent: Apr. 7, 1998

[54] METHOD AND DEVICE FOR LEARNING A FOREIGN LANGUAGE

[75] Inventor: Ruth Groiss, Jerusalem, Israel

[73] Assignee: Multi Lingua Ltd.., Jerusalem, Israel

[21] Appl. No.: 625,493

[22] Filed: Mar. 29, 1996

[51] Int. Cl.$^6$ .......................... G09B 19/06; G09B 19/08; G09B 3/00; A63F 9/00
[52] U.S. Cl. .......................... 434/157; 434/156; 434/167; 434/169; 434/178; 434/113; 434/322; 434/323; 434/327; 434/335; 273/429; 273/438; 463/7
[58] Field of Search .......................... 434/156, 157, 434/167, 158, 168, 169, 170, 176, 178, 179, 184, 112, 113, 116, 307 R, 308, 309, 321, 322, 323, 327, 335, 339; 273/429, 440, 454, 455; 364/189; 463/7

[56] References Cited

U.S. PATENT DOCUMENTS 4,245,405  1/1981  Lien et al. .......................... 434/178

*Primary Examiner*—Richard J. Apley
*Assistant Examiner*—John Rovnak
*Attorney, Agent, or Firm*—Mark M. Freidman

[57] ABSTRACT

A method for learning a foreign language by first memorizing conjugations of representative verbs using the human hearing, viewing and feeling senses, and a device for implementing the method, the device providing the feeling memorizing means, the method comprising the step of memorizing the conjugations of the language using the human hearing, viewing and feeling senses, wherein using the feeling sense is effected by having the conjugations symbolized by elements of the device, each having a specifying location and a specifying surface or construction conferring a learner with an associated specifying feeling, such that when the learner sees a scene displayed on a display and hears a sentence associated with that scene, which sentence includes an associated specific conjugation, the learner touches a specific corresponding element symbolizing the associated specific conjugation. The method further comprising the step of memorizing correct use of the tenses as combined with the conjugations, wherein memorizing correct use of tenses is effected by having the tenses symbolized by objects of the device having specifying positions, such that when the learner sees the scene displayed on the display and hears the sentence associated with that scene, which sentence involves the use of a specific tense, the learner touches or moves a specific corresponding object.

27 Claims, 2 Drawing Sheets

METHOD AND DEVICE FOR LEARNING A FOREIGN LANGUAGE

FIELD AND BACKGROUND OF THE INVENTION

The present invention relates to a method and device for learning a foreign language and, more particularly, to a method for learning a foreign (i.e., second, new, target, which are interchangeably used along this document) language by first memorizing conjugations and tenses of representative verbs using the human hearing, viewing and feeling senses, and a device for implementing the method, the device providing the feeling memorizing means.

Learning a foreign language at adulthood (e.g., from the age of ten) is a difficult task for most people.

Prevailing methods of language instruction are typically characterized by two main aspects, which include (i) learning with a teacher in a classroom both in formal and informal educational systems; and (ii) learning all four language skills simultaneously, i.e., listening, speaking, reading and writing.

As far as teaching methods are of concern, the art's literature documents various methods, beginning with the oldest, most traditional one—the translation method—to more modern ones, such as the audio-lingual method, the direct method, and the total immersion method.

The translation method is a classical language teaching method based on a logical analysis of the language, much memorization of complicated rules and paradigms, and the application of these in translation exercises. According to the translation method, reading and translation of texts is considered of great importance. Students are expected to know the rules for correct association of sounds with graphic symbols. They are given little opportunity to practice listening and speaking. For further details regarding the translation method see, Rivers, W. Wilga, Teaching foreign language skills, The University of Chicago Press, 1981, pp. 28-29.

The audio-lingual method is aimed at teaching language skills in the order of listening, speaking, reading and writing. To this end, material is presented in a spoken form, and the emphasis in the early years is on the language as it is spoken in everyday situations, whereas reading and writing at this stage play supportive roles. At advanced levels, students are introduced to more literary forms of expression. At all stages, listening and speaking skills are kept at high level by continual practice. For further details regarding the audio-lingual method see, Rivers, W. Wilga, Teaching foreign language skills, The University of Chicago Press, 1981, p. 43.

The direct method concerns learning a new language through direct association of words and phrases with objects and actions, without the use of the native language by either the teacher or the student. Thus, learning a new language according to the direct method is done without passing through an intermediate stage of translation into the native language. The ultimate aim according to this method is to develop the ability to think in the language terms, whether one is conversing, reading or writing. For further details regarding the direct method see, Rivers, W. Wilga, Teaching foreign language skills, The University of Chicago Press, 1981, p. 31.

The total immersion method basically involves setting up informal situations where students communicate with each other and their teacher, and, through communicating, acquire a new language. According to this method, a relationship of acceptance and equality between students and teacher, and among the students must exist. Trust and confidence are key words. Since the student is not taught explicitly but learns through experience, the total immersion method is an active inductive approach for language acquisition. For further details regarding the total immersion method see, Rivers, W. Wilga, Teaching foreign language skills, The University of Chicago Press, 1981, p. 52.

Each of these methods represents a new approach emphasizing one element or another in language acquisition. Yet, all of these methods are related in essence to one or more aspects of teaching methods with teachers. Most scholars agree that the best way to learn to speak a foreign language is to live in the relevant country or environment (the total immersion method is based on this principle).

The market of language learning offers several courses based on audio cassettes. These courses, which teach listening and speaking only, are based on memorizing new vocabulary using the hearing sense only and then using it in a context of a sentence. The knowledge is built gradually, layer upon layer, in a predetermined order. Some courses further provide grammatical explanations and exercising drills. The learning ritual associated with these courses is that the learner listens to sentences which are translated to his/her mother tongue (i.e., native language) or another language he/she is familiar with, and then the learner repeats them. Therefore, this method limits the courses to people who know the language to which the target language is translated.

The market of language learning further offers several audio-visual (e.g., video) courses, which are basically filmed lessons using live action. These courses teach all four language skills as is done in a classroom and make extensive use of dialogues. Many of these courses are used as a supplement to class curriculum.

Recently, computer technology has been harnessed to teaching all school subjects, including languages. As far as language learning is of concern, computer based courses are now available. These courses are also directed at teaching all four language skills using the computer screen and the keyboard. Computer software aimed at language acquisition is based on the "tree" principal, according to which, a language learner reaches crossroads offering several options each leading to another crossroads, etc. In many cases, therefore, a teacher's presence becomes essential in such a "democratic" environment.

It is appreciated by the art scholars that one of the most important aspects of learning a new language is the appropriate use of conjugations in past, present and future tenses as combined with singular and plural forms, with the appropriate gender (i.e., feminine, masculine) and with a verb. This is probably so, since conjugations are the most variable component of any language and practically form the pivot of most sentences. For example, in Israel ca. 80–90% of spoken Hebrew mistakes characterizing new immigrants, are associated with inappropriate use of conjugations in combination with pronouns (please note that in Hebrew and other languages a pronoun is not always present in a sentence which may become a single word, e.g., the sentence 'I went' when translated to Hebrew reads as 'ANI HALACHTI' or alternatively simply 'HALACHTI' which is a one word sentence derived from the verb 'to go'—'LALECHET') and with tenses. Other language components such as for example adjectives, adverbs, propositions and nouns are much less variable in most languages, therefore these components are easier to memorize and retrieve.

According to the prior art language learning methods described hereinabove, memorizing both conjugations and vocabulary is based upon using two of the five human senses, i.e., hearing and viewing. Other senses such as feeling, although used in the past to supposedly alert a learner by hitting, is not employed for memorizing according to these methods.

On the other hand, when teaching a new language to blind and/or deaf individuals, an extensive and highly effective use of the feeling sense is exercised to compensate for the missing sense and to increase the handicap individuals memorizing of the new language. Furthermore, the sense of feeling is associated with memorizing numbers and counting typically amongst children.

The present invention combines the hearing, viewing and feeling senses to increase learners ability to memorize conjugations as combined with tenses which form the pivot of most sentences in all languages, are highly variable and are therefore most difficult to memorize and learn.

There is thus a widely recognized need for, and it would be highly advantageous to have a method for learning a foreign language by first memorizing conjugations and tenses of representative verbs using the human hearing, viewing and feeling senses, and a device for implementing the method, the device providing the feeling memorizing means.

SUMMARY OF THE INVENTION

According to the present invention there is provided a method for learning a foreign language by first memorizing conjugations and tenses of representative verbs using the human hearing, viewing and feeling senses, and a device for implementing the method, the device providing the feeling memorizing means.

According to further features in preferred embodiments of the invention described below, the method comprising the step of memorizing the conjugations of the language using the human hearing, viewing and feeling senses, wherein using the feeling sense is effected by having the conjugations symbolized by elements, each having a specifying location and a specifying surface or construction conferring a learner with an associated specifying feeling, such that when the learner sees a scene displayed on a display and hears a sentence associated with that scene, which sentence includes an associated specific conjugation, the learner touches a specific corresponding element symbolizing the associated specific conjugation.

According to still further features in the described preferred embodiments the method further comprising the step of memorizing correct use of the tenses as combined with the conjugations, wherein memorizing correct use of the tenses is effected by having the tenses symbolized by objects having specifying positions, such that when the learner sees the scene displayed on the display and hears the sentence associated with that scene, which sentence involves the use of a specific tense, the learner touches or moves a specific corresponding object.

According to still further features in the described preferred embodiments the device comprising elements, each having a specifying location and a specifying surface or construction conferring the learner with an associated specifying feeling, each of the elements symbolizing a specific conjugation, such that when the learner sees a scene displayed on a display and hears a sentence associated with that scene, which sentence includes an associated specific conjugation, the learner touches a specific corresponding element symbolizing the associated specific conjugation.

According to still further features in the described preferred embodiments the device further comprising objects each having specifying positions, each of the positions symbolizing a specific tense, such that when the learner sees the scene displayed on the display and hears the sentence associated with that scene, which sentence involves use of the specific tense, the learner touches or moves a specific corresponding object of the objects.

According to still further features in the described preferred embodiments the elements and objects are arranged on a keyboard.

According to still further features in the described preferred embodiments the surface of each of the elements includes a specifying combination of rough regions, smooth regions and finger felt geometric forms.

According to still further features in the described preferred embodiments the surface of each of the elements includes a Braille code specifying a different conjugation.

According to still further features in the described preferred embodiments the number of elements is between eight and eighteen.

According to still further features in the described preferred embodiments the display is displayed on a screen selected from the group consisting of a television screen and a computer screen.

According to still further features in the described preferred embodiments the scene is effected by a video-cassette.

According to still further features in the described preferred embodiments the scene is effected by a software transmitted to the display by means selected from the group consisting of CD-ROM, on-line telephonia transmission and wide band data over cable transmission.

According to still further features in the described preferred embodiments the scene displayed on the display includes a visual indication of the specific conjugation and tense.

According to still further features in the described preferred embodiments the display is indicating the learner of success or failure in correlating between the specific conjugation/tense and the specific corresponding element/object.

According to still further features in the described preferred embodiments the objects are a left hand operated and a right hand operated joy sticks, each of the joy sticks has few orientations, each of the orientations symbolizes a specific tense, the elements are implemented on the joy sticks, the joy sticks operate by hands movement, whereas the elements operate by fingers movements.

According to still further features in the described preferred embodiments the tenses include a past tense, a present tense and a future tense.

According to still further features in the described preferred embodiments the device comprising elements, each having a specifying location and a specifying surface or construction conferring the learner with an associated specifying feeling, each of the elements symbolizing a specific conjugation, such that when the learner sees a scene displayed on a display and hears a sentence associated with that scene, which sentence includes an associated specific conjugation, the learner touches a specific corresponding element symbolizing the associated specific conjugation.

According to still further features in the described preferred embodiments the device further comprising objects each having specifying positions, each of the positions symbolizing a specific tense, such that when the learner sees the scene displayed on the display and hears the sentence associated with that scene, which sentence involves use of the specific tense, the learner touches or moves a specific corresponding object of the objects.

The present invention successfully addresses the shortcomings of the presently known configurations by providing a method and device for learning a foreign language which can be used by adults to acquire a new language. Learning a foreign language according to the inventive method and device is effected by first memorizing conjugations of representative verbs using the human hearing, viewing and feeling senses, collectively increasing memorizing capabilities.

BRIEF DESCRIPTION OF THE DRAWINGS

The invention herein described, by way of example only, with reference to the accompanying drawings, wherein.

DESCRIPTION OF THE PREFERRED EMBODIMENTS

Figure 1A:
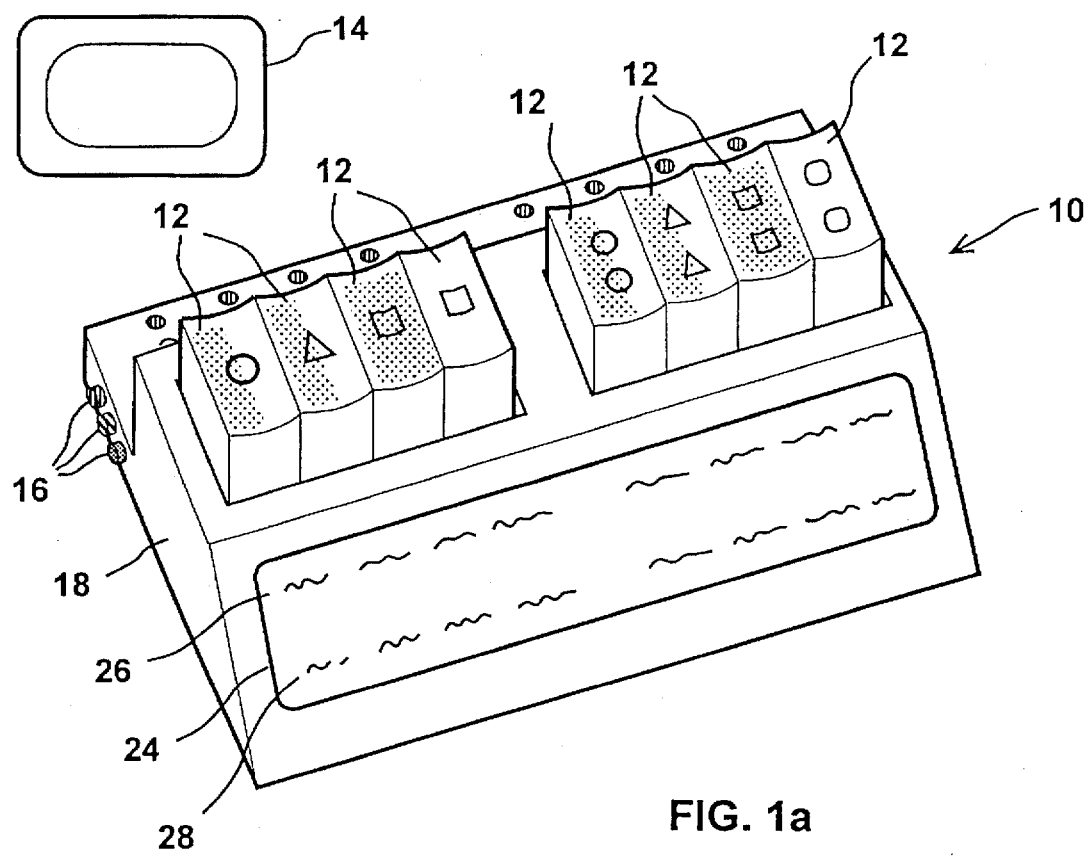
FIGS. 1a and 1b are two perspective views of the device according to the teachings of the present invention.

The present invention is of a method and device for learning a foreign language which can be used by adults to acquire a new language. Learning a foreign language according to the inventive method and device is effected by first memorizing conjugations and tenses of representative verbs using the human hearing, viewing and feeling senses.

The principles and operation of a method and device according to the present invention may be better understood with reference to the drawings and accompanying descriptions.

In contradistinction to acquiring a first language (i.e., a mothers tongue) at early childhood, the basics of learning a new language at adulthood is acquiring the ability to use conjugations and tenses in appropriate contexts. Nevertheless, since, not like vocabulary, conjugations and tenses are highly variable in most spoken languages, this becomes a difficult task. As the English language, for example, is characterized by eight different conjugations (i.e., for singular forms: I, you, he, she, it; for plural forms: we, you, they), and three simple tenses (i.e., past, present and future) it has a minimum of twenty-four combinations of conjugations and simple tenses. It should however be remembered that the number of tenses and thus the number of combinations is higher (e.g., continuous tenses). As shown in Table 1 below, other languages, such as French and Hebrew are characterized by a greater number of conjugations, nine and ten respectively. Still other languages are characterized by an even greater number of conjugations, the maximal number of possible conjugations for an imaginary language probably being eighteen (e.g., including distinguished conjugation for plural objects, referring to objects by gender, etc.).

As described above in the background section, memorizing conjugations according to prior art methods is exercised taking advantage of the human listening and viewing senses. In rare cases where the learner is either blind or deaf the feeling sense may be successfully used for replacing the associated missing viewing or listening senses, respectively, in memorizing conjugations and verbs.

TABLE 1

Comparative conjugations in English, French and Hebrew

|  | English: | French: | Hebrew: |
|---|---|---|---|
| Singular forms: | | | |
| M/F | I | Je | ANI אני |
| M* | You | Tu | ATA אתה |
| F** | You | Tu | AT את |
| M | he | Il | HU הוא |
| F | She | Elle | HI היא |
| O*** | It | On | HI/HU הוא/היא |
| Plural forms: | | | |
| M/F | We | Nous | ANACHNU אנחנו |
| M | You | Vous | ATEM אתם |
| F | You | Vous | ATEN אתן |
| M | They | Ils | HEM הם |
| F | They | Elles | HEN הן |

\* masculine, \*\*feminine, \*\*\*object

The inventive method and device are directed at combining all three senses, i.e., listening, viewing and feeling, to facilitate memorizing the appropriate use of conjugations and tenses when acquiring a foreign spoken language to an adult learner.

Thus, according to the method of the present invention, learning a spoken language having conjugations and tenses includes memorizing the conjugations of the language using the human hearing, viewing and feeling senses, wherein using the feeling sense is effected by having the conjugations symbolized by elements, each having a specifying location and further having a specifying surface or construction conferring a learner with an associated specifying feeling, such that when the learner sees a scene displayed on a display and hears a sentence which includes an associated specific conjugation associated with that scene, the learner touches a specific corresponding element which symbolizes the associated specific conjugation.

Preferably the method further includes memorizing correct use of tenses as combined with the conjugations, wherein memorizing of the correct use of tenses is effected by having the tenses symbolized by objects having specifying positions, such that when the learner sees the scene displayed on the display and hears the sentence which involves use of a specific tense associated with that scene, the learner touches or moves a specific corresponding object.

The elements and objects thus described form the inventive device of the present invention, which device is for providing the feeling memorizing means thus described.

In a preferred embodiment the scene is animated. Animation is preferred since it is amusing and universal and is easily dubbed into many languages.

Figure 1B:
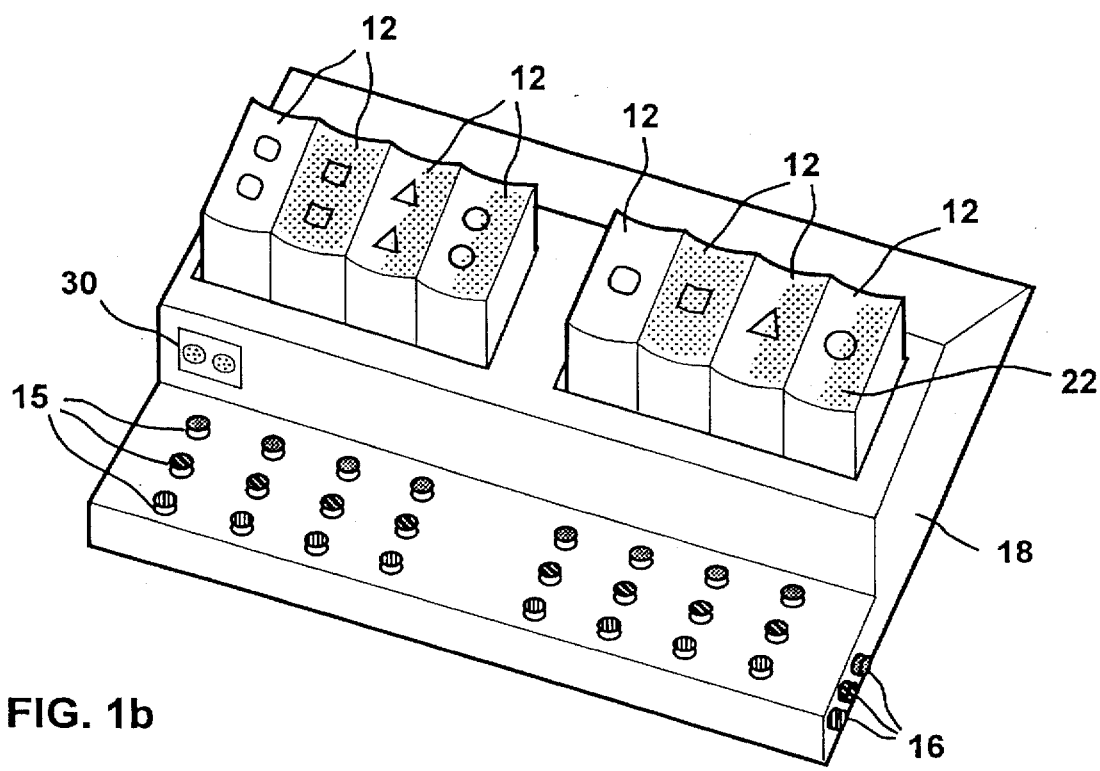
Figure 2:
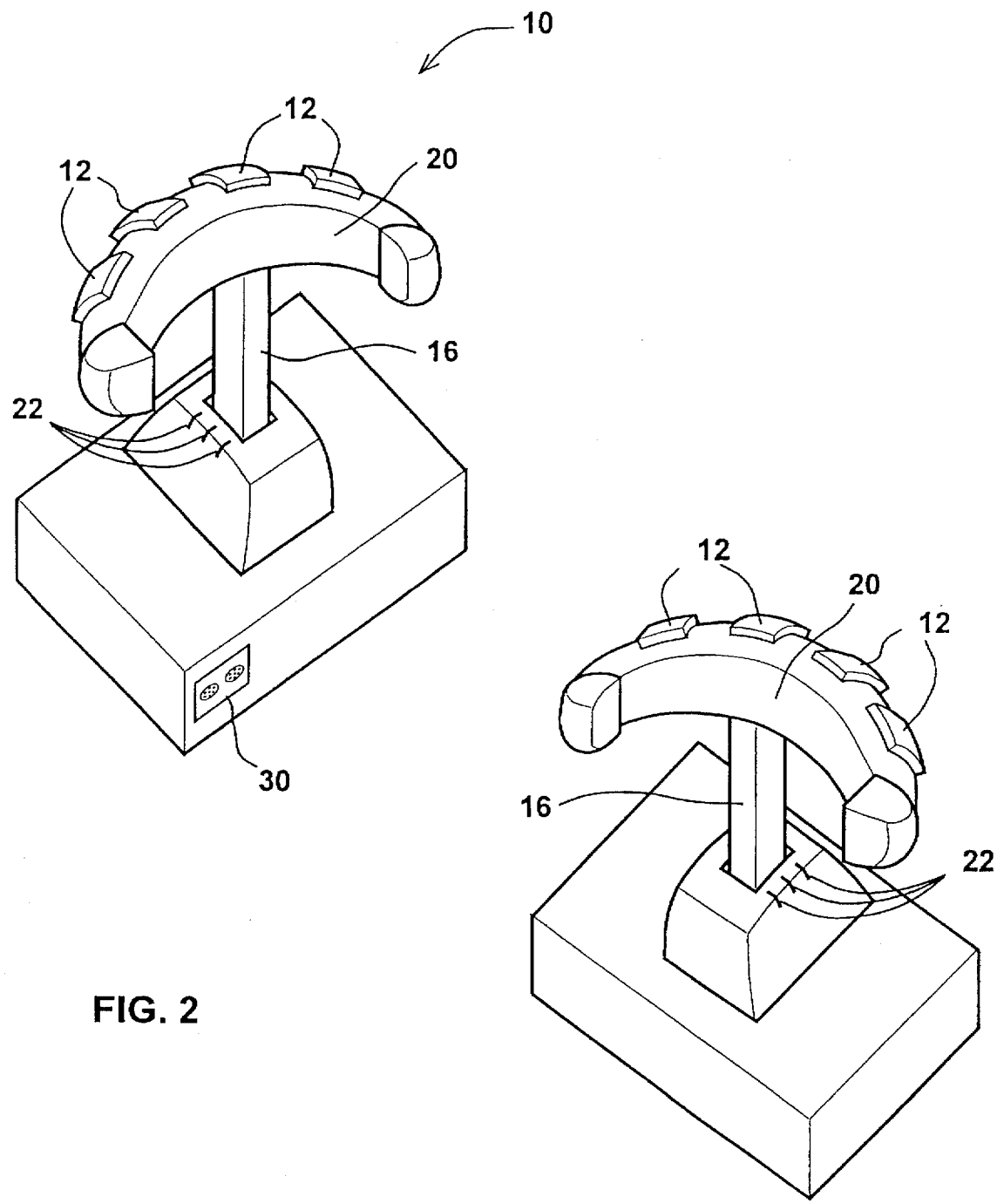
FIG. 2 is a perspective view of another embodiment of the device according to the teachings of the present invention.

Referring now to the drawings, FIGS. 1a–b and 2 illustrates two presently preferred embodiments of the device according to the present invention, referred hereinbelow as device 10.

In the examples of FIGS. 1a–b and 2, device 10 is directed at providing eight different feelings associated with eight different conjugations (four singular forms and four plural forms). Yet, as will be appreciated by one ordinarily skilled in the art, and as will be shortly described, device 10 may acquire configurations suitable for languages having more or less number of conjugations. Furthermore, device 10 as exemplified in the accompanying Figures is directed at providing three different feelings associated with the three simple tenses, i.e., past, present and future tenses. Yet, as will further be appreciated by one ordinarily skilled in the art, the number of tenses associated feelings may be increased to include additional tenses, such as for example continuos tenses.

Thus, device 10 includes elements 12, each having a specifying location and further having a specifying surface or construction conferring the learner with an associated specifying feeling, each of said elements symbolizing a specific conjugation, such that when the learner sees a scene displayed on a display 14 (e.g., a television screen or a computer screen) and hears a sentence associated with that scene, the learner touches a specific corresponding element 12 symbolizing the associated specific conjugation.

Device 10 preferably further includes objects 16 having specifying positions, each of the positions symbolizing a specific tense, such that when the learner sees the scene displayed on display 14 and hears the sentence associated with that scene, the learner touches or moves a specific corresponding object 16.

As shown in FIGS. 1a–b, in a preferred embodiments objects 16 and elements 12 are arranged on a keyboard 18. Yet, as shown in FIG. 2, in another preferred embodiment objects 16 are a left hand operated and a right hand operated joy sticks 20, each of joy sticks 20 has few orientations (i.e., positions) as indicated by 22, each of orientations 22 symbolizes a specific tense. In this case, elements 12 are implemented on joy sticks 20, wherein joy sticks 20 are operated by hands movement, whereas elements 12 are operate by fingers movement.

Displaying the scene on display 14 may be effected in various ways, depending on the specific display means used (e.g., a television screen or a computer screen). Thus for example, displaying the scene on display 14 may be effected by a video-cassette or a software generated scene transmitted to display 14 by means such as computer disc transmission, CD-ROM transmission, on-line telephonia transmission or wide band data over cable transmission.

In a preferred embodiment, the scene displayed on display 14 includes a visual indication of the specific conjugation and tense. Such a visual indication may be for example a color display, each color is associated with a specific tense, such as for example red for past tense, yellow for present tense and green for future tense, collectively forming a color selection which is easy to remember associatively since the red, yellow and green colors are attributed similar meanings when used in context of traffic lights.

Other indications such as for example but not limited to figure(s) of individual(s) pointing at themselves or at other (s), the figure(s) having either masculine or feminine appearance(s), may be used to indicate conjugations.

Furthermore, since each of the conjugations is associated with a specific element 12, which is operated (i.e., touched) by a specific finger of the learner, conjugations may be indicated by displaying a scheme of the human hands and indicating specific finger in the displayed hands which is associated with the operation of the specific element 12.

Yet, furthermore, both the tenses and conjugations may be indicated simultaneously by for example indicating the finger by a tense associated color as indicated above. Alternatively, indication of a conjugation and a tense associated with a given scene may be effected by displaying a planar image of device 10 as exemplified in FIGS. 1a–b and by pointing out (i.e., indicating) the specific element 12 and object 16 associated with the specific conjugation and tense, respectively.

In yet another preferred embodiment, display 14 is communicating with device 10, such that the learner is indicated of success or failure in correlating between specific conjugations and tenses and specific corresponding elements 12 and objects 16 (or their position, i.e., orientation), respectively. Such indication is preferably transmitted to the learner by a pleasant or an unpleasant sound, respectively, as well known in the art.

Nevertheless, if the scene is displayed using a videocassette, device 10 cannot communicate with display 14. In this case, as best seen in FIG. 1b, device 10 is further supplemented with indicators 15, arranged in relation (e.g., parallel) to elements 12, indicating the learner of his tense selection as combined with his/her conjugation selection selected using objects 16 and elements 12. As further shown in FIGS. 1a–b, in a preferred embodiment indicators 15 are lighted in colors associated with specific tenses, such as for example red for past tense, yellow for present tense and green for future tense forming a color selection which is easy to remember associatively as described above.

As mentioned above, each of elements 12 has a specifying location and a specifying surface or construction conferring the learner with an associated specifying feeling, each of said elements symbolizing a specific conjugation. As best seen in FIGS. 1a–b, surface 22 of each of elements 12 includes a specifying combination of rough regions (indicated by dots), smooth regions and finger felt geometric forms such as circles squares and triangles.

Nevertheless, as will be appreciated by one ordinarily skilled in the art, surfaces 22 of elements 12 may be equipped with letters, such as for example Braille codes for specifying each of the conjugations (not shown). In yet another, presently less preferred embodiment, each of elements 12 acquires a specifying construction (i.e., form), each of the forms is associated with one of the conjugations. The forms may be selected by having each of elements 12 sized or shaped differently.

In yet another preferred embodiment, elements 12 are grouped into two groups one for singular form conjugations and the other for plural form conjugations, elements 12 of each of the groups are activated by a different hand of the learner, each element is activated by a specifying finger.

In yet another preferred embodiment, as best seen in FIG. 1a device 10 further includes a note 24 aligned with elements 12. Note 24 includes a lower row 28 dictating the new language conjugations and an upper row 26 dictating a translation of these conjugations to the learner's mother tongue.

In yet another preferred embodiment, device 10 further includes lingual recording means 30 (e.g., a tape recorder) for recording the learner when verbally practicing the new language as described above and displaying the records to the learner thereafter.

The operation of the method and device of the present invention according to their preferred embodiments is as follows. A scene is displayed on the display and is accompanied by a sentence. First the sentence is spelled at a slow speed and then it is repeated in medium and normal speaking speed. The scene and sentence are simple, include a conjugation and a tense which can be understood simply by watching the scene. No translation is involved. In parallel, indications of the specific conjugation and/or tense, as described above, appear on the display. Aided by the indications, the learner repeats the sentence and at the same time touches (e.g., presses, activates) the element associated with the specific conjugation and moves or touches (i.e., activates) the object associated with the specific tense, all as understood by viewing the scene and as indicated by the above mentioned indications. In a preferred embodiment the learner is indicated by for example sound of his success or failure. By dividing the verbs of the learned spoken language into groups such as for example regular verbs (e.g., move, jump, etc.) and exceptional verbs (e.g., run, go, etc.) each group has a common denominator of the conjugation's dynamic, and repeating the drill as described for each group of verbs, assists the learner to memorize the appropriate use of conjugations as combined with the appropriate use of tenses in the learned language.

While the invention has been described with respect to a limited number of embodiments, it will be appreciated that many variations, modifications and other applications of the invention may be made.

What is claimed is:

1. A method for learning a spoken language having conjugations and tenses, the method comprising the step of memorizing the conjugations of the language using the human hearing, viewing and feeling senses, wherein using said feeling sense for said memorizing of said conjugations is effected by having said conjugations symbolized by elements, each having a specifying location, and further having a specifying surface or construction conferring a learner with an associated specifying feeling, such that when the learner sees a scene displayed on a display and hears a sentence associated with that scene, said sentence includes an associated specific conjugation, the learner touches a specific corresponding element of said elements, said specific corresponding element symbolizing said associated specific conjugation.

2. A method as in claim 1, further comprising the step of memorizing correct use of said tenses as combined with said conjugations, wherein said memorizing of said correct use of said tenses is effected by having said tenses symbolized by objects having specifying positions, such that when the learner sees said scene displayed on said display and hears said sentence associated with that scene, said sentence involves use of a specific tense, the learner touches or moves a specific corresponding object of said objects.

3. A method as in claim 1, wherein said surface of each of said elements includes a specifying combination of rough regions, smooth regions and finger felt geometric forms.

4. A method as in claim 1, wherein said surface of each of said elements includes a Braille code specifying a different conjugation.

5. A method as in claim 1, wherein the number of elements is between eight and eighteen.

6. A method as in claim 1, wherein said display is displayed on a screen selected from the group consisting of a television screen and a computer screen.

7. A method as in claim 1, wherein said scene displayed on said display includes a visual indication of said specific conjugation.

8. A method as in claim 1, wherein said display is indicating the learner of success or failure in correlating between said specific conjugation and said specific corresponding element.

9. A method as in claim 2, wherein said display is a screen selected from the group consisting of a television screen and a computer screen.

10. A method as in claim 2, wherein said scene displayed on said display includes a visual indication of said specific tense.

11. A method as in claim 10, wherein said scene displayed on said display further includes a visual indication of said specific conjugation.

12. A method as in claim 2, wherein said display is indicating the learner of success or failure in correlating between said specific conjugation and said specific corresponding element.

13. A method as in claim 12, wherein said display is further indicating the learner of success or failure in correlating between said specific tense and a specific corresponding position of said specific corresponding object.

14. A device for learning a spoken language having conjugations and tenses, the device comprising elements, each having a specifying location and further having a specifying surface or construction conferring a learner with an associated specifying feeling, each of said elements symbolizing a specific conjugation, such that when the learner sees a scene displayed on a display and hears a sentence associated with that scene, said sentence includes an associated specific conjugation, the learner touches a specific corresponding element of said elements, said specific corresponding element symbolizing said associated specific conjugation.

15. A device as in claim 14, further comprising objects each having specifying positions, each of said positions symbolizing a specific tense, such that when the learner sees said scene displayed on said display and hears said sentence associated with that scene, said sentence involves use of said specific tense, the learner touches or moves a specific corresponding object of said objects.

16. A device as in claim 14, wherein said surface of each of said elements includes a specifying combination of rough regions, smooth regions and finger felt geometric forms.

17. A device as in claim 14, wherein said surface of each of said elements includes a Braille code specifying a different conjugation.

18. A device as in claim 14, wherein the number of elements is between eight and eighteen.

19. A device as in claim 14, wherein said display is displayed on a screen selected from the group consisting of a television screen and a computer screen.

20. A device as in claim 14, wherein said scene displayed on said display includes a visual indication of said specific conjugation.

21. A device as in claim 14, wherein said display is communicating with said device, such that the learner is indicated of success or failure of correlating between said specific conjugation and said specific corresponding element.

22. A device as in claim 15, wherein said tenses include a past tense, a present tense and a future tense.

23. A device as in claim 15, wherein said display is a screen selected from the group consisting of a television screen and a computer screen.

24. A device as in claim 15, wherein said scene displayed on said display includes a visual indication of said specific tense.

25. A device as in claim 24, wherein said scene displayed on said display further includes a visual indication of said specific conjugation.

26. A device as in claim 15, wherein said display is communicating with said device, such that the learner is indicated of success or failure of correlating between said specific conjugation and said specific corresponding element.

27. A device as in claim 26, wherein said display is further communicating with said device, such that the learner is indicated of success or failure of correlating between said specific tense and a specific corresponding position of said specific corresponding object.

* * * * *